US012085827B2

(12) United States Patent
Wu

(10) Patent No.: US 12,085,827 B2
(45) Date of Patent: Sep. 10, 2024

(54) DISPLAY PANEL AND DISPLAY DEVICE

(71) Applicant: GUANGZHOU CHINA STAR OPTOELECTRONICS SEMICONDUCTOR DISPLAY TECHNOLOGY CO., LTD., Guangdong (CN)

(72) Inventor: Wei Wu, Guangdong (CN)

(73) Assignee: GUANGZHOU CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/756,644

(22) PCT Filed: May 13, 2022

(86) PCT No.: PCT/CN2022/092743
§ 371 (c)(1),
(2) Date: May 29, 2022

(87) PCT Pub. No.: WO2023/206626
PCT Pub. Date: Nov. 2, 2023

(65) Prior Publication Data
US 2024/0160072 A1    May 16, 2024

(30) Foreign Application Priority Data

Apr. 29, 2022   (CN) .......................... 202210472458.1

(51) Int. Cl.
G02F 1/1362   (2006.01)
G02F 1/1368   (2006.01)

(52) U.S. Cl.
CPC ...... *G02F 1/1368* (2013.01); *G02F 1/136209* (2013.01); *G02F 1/136286* (2013.01)

(58) Field of Classification Search
CPC ..................................................... G02F 1/1362
See application file for complete search history.

(56) References Cited

U.S. PATENT DOCUMENTS

2013/0023086 A1* 1/2013 Chikama ............... G02F 1/1368
                                                              257/E21.409
2013/0175548 A1* 7/2013 Kudou .................. H01L 21/049
                                                              257/77
(Continued)

FOREIGN PATENT DOCUMENTS

CN    102466933 A    5/2012
CN    103413813 A    11/2013
(Continued)

OTHER PUBLICATIONS

Chinese Office Action issued in corresponding Chinese Patent Application No. 202210472458.1 dated Apr. 24, 2023, pp. 1-7.
(Continued)

*Primary Examiner* — Sang V Nguyen
(74) *Attorney, Agent, or Firm* — PV IP PC; Wei Te Chung

(57) ABSTRACT

A display panel and a display device are disclosed. The display panel includes a first substrate, a second substrate, and a liquid crystal layer. The first substrate includes a first base, a thin film transistor layer, and a plurality of pixel electrodes. The thin film transistor layer includes an insulating layer and a plurality of data lines. The data lines are divided into a plurality of first subsections corresponding to the pixel electrodes. A sum of thicknesses of the insulating layer and the first base corresponding to positions of the first subsections is less than a sum of thicknesses of the insulating layer and the first base corresponding to positions of the pixel electrodes.

20 Claims, 4 Drawing Sheets

(56) References Cited

U.S. PATENT DOCUMENTS

2013/0242247 A1\* 9/2013 Lee .................. G02F 1/133707
438/609
2022/0113600 A1 4/2022 Zhang

FOREIGN PATENT DOCUMENTS

| CN | 103489878 A | 1/2014 |
|----|-------------|--------|
| CN | 104393019 A | 3/2015 |
| CN | 105762154 A | 7/2016 |
| CN | 106842741 A | 6/2017 |
| CN | 107132687 A | 9/2017 |
| JP | 2001075123 A | 3/2001 |
| KR | 20200076061 A | 6/2020 |

OTHER PUBLICATIONS

International Search Report in International application No. PCT/CN2022/092743, mailed on Dec. 22, 2022.
Written Opinion of the International Search Authority in International application No. PCT/CN2022/092743, mailed on Dec. 22, 2022.

\* cited by examiner

DISPLAY PANEL AND DISPLAY DEVICE

FIELD OF INVENTION

The present disclosure relates to the field of display technologies, and more particularly, to a display panel and a display device.

BACKGROUND OF INVENTION

With development of display technologies, large-sized liquid crystal display technologies have received extensive attention.

At present, in large-sized display panels such as the large-sized display panels using oxide thin film transistors, impedance of data signal lines is usually reduced by increasing a thickness of the data signal lines. However, with increase of the thickness of the data signal lines, surface flatness of array substrates in the display panels is reduced. In particular, the array substrates are formed with higher protrusions at positions corresponding to the data signal lines, which results in that brushes cannot be pressed down in time when passing through the positions of the array substrates that correspond to the data signal lines during alignment processes such as rubbing alignment layers with the brushes, thereby causing a problem of insufficient rubbing alignment at nearby positions of the alignment layers corresponding to the data signal lines, thereby affecting normal display of the display panels.

Technical problem: an embodiment of the present disclosure provides a display panel and a display device to solve a technical problem of insufficient alignment caused by a thick thickness of the data signal lines in the large-sized display panels.

SUMMARY OF INVENTION

An embodiment of the present disclosure provides a display panel, which includes a first substrate, a second substrate disposed opposite to the first substrate, and a liquid crystal layer disposed between the first substrate and the second substrate, wherein, the first substrate includes:
  a first base;
  a thin film transistor layer disposed on the first base and
    including an insulating layer disposed on the first base,
    a plurality of data lines disposed on the insulating layer
    and extending along a first direction, and a plurality of
    scan lines disposed on the insulating layer and extending along a second direction, wherein, a default
    included angle is defined between the second direction
    and the first direction; and
  a plurality of pixel electrodes disposed on the thin film
    transistor layer and located in areas divided by the data
    lines and the scan lines.
  Wherein, the data lines include a plurality of first subsections corresponding to the pixel electrodes and a plurality of second subsections connected to the first subsections, one first subsection is disposed between two adjacent pixel electrodes, and a sum of thicknesses of the insulating layer and the first base at least corresponding to positions of the first subsections is less than a sum of thicknesses of the insulating layer and the first base corresponding to positions of the pixel electrodes.

In the display panel provided in an embodiment of the present disclosure, the insulating layer includes a plurality of first grooves corresponding to the first subsections, and one first subsection is disposed in one first groove; and
  in a direction perpendicular to the first substrate, a depth of the first grooves is less than or equal to a thickness of the insulating layer.

In the display panel provided in an embodiment of the present disclosure, in the direction perpendicular to the first substrate, the depth of the first grooves is equal to the thickness of the insulating layer; and
  the first base includes a plurality of second grooves corresponding to the first grooves, in the direction perpendicular to the first substrate, the first grooves are communicated with corresponding second grooves, and the first subsections are at least partially located in the second grooves.

In the display panel provided in an embodiment of the present disclosure, in the direction perpendicular to the first substrate, a depth of the second grooves is less than a thickness of the first base.

In the display panel provided in an embodiment of the present disclosure, the thin film transistor layer further includes a first metal layer disposed between the insulating layer and the first base, a second metal layer disposed on one side of the insulating layer away from the first metal layer, and a passivation protective layer disposed on the second metal layer and the insulating layer and covering the second metal layer, the pixel electrodes are disposed on the passivation protective layer, the first metal layer includes the scan lines, and the second metal layer includes the data lines; and
  in the first direction, a spacing between the first grooves and the scan lines is greater than or equal to 1.5 um.

In the display panel provided in an embodiment of the present disclosure, in the direction perpendicular to the first substrate, the depth of the first grooves is less than the thickness of the insulating layer; and
  the insulating layer includes a plurality of communicating grooves corresponding to the second subsections, in the first direction, two adjacent communicating grooves are communicated with each other by one first groove, and one second subsection is disposed in one communicating groove.

In the display panel provided in an embodiment of the present disclosure, the passivation protective layer includes bosses corresponding to the second subsections, and a thickness of the bosses is less than or equal to 300 nm.

In the display panel provided in an embodiment of the present disclosure, the first base includes a plurality of third grooves corresponding to the first subsections, and the insulating layer is disposed on the first base and is at least partially filled in the third grooves; and
  in a direction perpendicular to the first substrate, a depth of the third grooves is less than a thickness of the first base.

In the display panel provided in an embodiment of the present disclosure, the second substrate includes a second base and a black matrix disposed on one side of the second base adjacent to the first base, and the black matrix includes a plurality of light-transmitting openings corresponding to the pixel electrodes by one to one; and
  in the first direction, a length of the first grooves is greater than a length of the light-transmitting openings.

In the display panel provided in an embodiment of the present disclosure, in the first direction, a length of the first subsections is greater than a length of the pixel electrodes.

The present disclosure further provides a display device, which includes a display panel and a backlight module combined with the display panel;
  wherein, the display panel includes a first substrate, a second substrate disposed opposite to the first substrate, and a liquid crystal layer disposed between the first substrate and the second substrate, and the first substrate includes:

a first base;

a thin film transistor layer disposed on the first base and including an insulating layer disposed on the first base, a plurality of data lines disposed on the insulating layer and extending along a first direction, and a plurality of scan lines disposed on the insulating layer and extending along a second direction, wherein, a default included angle is defined between the second direction and the first direction; and a plurality of pixel electrodes disposed on the thin film transistor layer and located in areas divided by the data lines and the scan lines;

wherein, the data lines include a plurality of first subsections corresponding to the pixel electrodes and a plurality of second subsections connected to the first subsections, one first subsection is disposed between two adjacent pixel electrodes, and a sum of thicknesses of the insulating layer and the first base at least corresponding to positions of the first subsections is less than a sum of thicknesses of the insulating layer and the first base corresponding to positions of the pixel electrodes.

In the display device provided in an embodiment of the present disclosure, the insulating layer includes a plurality of first grooves corresponding to the first subsections, and one first subsection is disposed in one first groove; and in a direction perpendicular to the first substrate, a depth of the first grooves is less than or equal to a thickness of the insulating layer.

In the display device provided in an embodiment of the present disclosure, in the direction perpendicular to the first substrate, the depth of the first grooves is equal to the thickness of the insulating layer; and the first base includes a plurality of second grooves corresponding to the first grooves, in the direction perpendicular to the first substrate, the first grooves are communicated with corresponding second grooves, and the first subsections are at least partially located in the second grooves.

In the display device provided in an embodiment of the present disclosure, in the direction perpendicular to the first substrate, a depth of the second grooves is less than a thickness of the first base.

In the display device provided in an embodiment of the present disclosure, the thin film transistor layer further includes a first metal layer disposed between the insulating layer and the first base, a second metal layer disposed on one side of the insulating layer away from the first metal layer, and a passivation protective layer disposed on the second metal layer and the insulating layer and covering the second metal layer, the pixel electrodes are disposed on the passivation protective layer, the first metal layer includes the scan lines, and the second metal layer includes the data lines; and in the first direction, a spacing between the first grooves and the scan lines is greater than or equal to 1.5 um.

In the display device provided in an embodiment of the present disclosure, in the direction perpendicular to the first substrate, the depth of the first grooves is less than the thickness of the insulating layer; and the insulating layer includes a plurality of communicating grooves corresponding to the second subsections, in the first direction, two adjacent communicating grooves are communicated with each other by one first groove, and one second subsection is disposed in one communicating groove.

In the display device provided in an embodiment of the present disclosure, the passivation protective layer includes bosses corresponding to the second subsections, and a thickness of the bosses is less than or equal to 300 nm.

In the display device provided in an embodiment of the present disclosure, the first base includes a plurality of third grooves corresponding to the first subsections, and the insulating layer is disposed on the first base and is at least partially filled in the third grooves; and in a direction perpendicular to the first substrate, a depth of the third grooves is less than a thickness of the first base.

In the display device provided in an embodiment of the present disclosure, the second substrate includes a second base and a black matrix disposed on one side of the second base adjacent to the first base, and the black matrix includes a plurality of light-transmitting openings corresponding to the pixel electrodes by one to one; and in the first direction, a length of the first grooves is greater than a length of the light-transmitting openings.

In the display device provided in an embodiment of the present disclosure, in the first direction, a length of the first subsections is greater than a length of the pixel electrodes.

Beneficial effect: beneficial effects of the present disclosure: by dividing the data lines into the plurality of first subsections corresponding to the pixel electrodes and the plurality of second subsections connected to the first subsections, and setting the sum of the thicknesses of the insulating layer and the first base that at least correspond to the positions of the first subsections to be less than the sum of the thicknesses of the insulating layer and the first base that correspond to the positions of the pixel electrodes, a height difference between positions of the first substrate corresponding to the data lines and corresponding to the pixel electrodes can be reduced. Therefore, a problem of insufficient alignment due to low flatness of the first substrate can be prevented, thereby ensuring normal display of the display panel.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which figures those skilled in the art can derive further figures without making any inventive efforts.

DETAILED DESCRIPTION OF PREFERRED EMBODIMENTS

Figure 1:
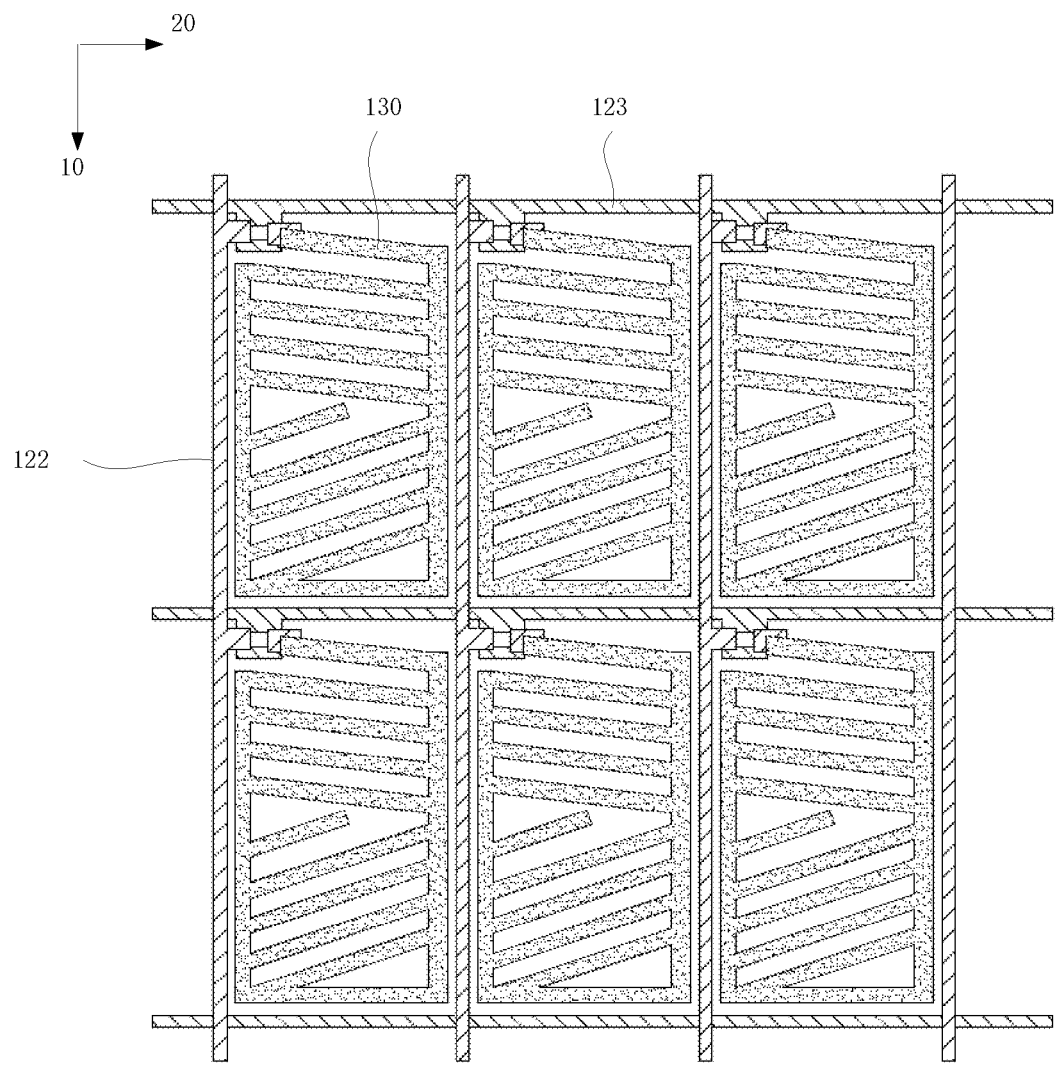
FIG. 1 is a schematic top view of a display panel according to an embodiment of the present disclosure.

The specific embodiments described with reference to the attached drawings are all exemplary and are intended to illustrate and interpret the present disclosure. In the description of the present disclosure, it should be understood that terms such as "upper", "lower", "front", "rear", "left", "right", "inside", "outside", "side", as well as derivative thereof should be construed to refer to the orientation as described or as shown in the drawings under discussion. Therefore, the directional terms used are to illustrate and understand the present disclosure, not to limit the present disclosure. The identical or similar reference numerals constantly denote the identical or similar elements or elements having the identical or similar functions in the drawings.

In the description of the present disclosure, it can be understood that terms such as "first" and "second" are used herein for purposes of description and are not intended to indicate or imply relative importance or implicitly indicating the number of technical features indicated. Thus, features limited by "first" and "second" are intended to indicate or imply including one or more than one of these features. In the description of the present disclosure, "a plurality of" relates to two or more than two, unless otherwise specified.

In the description of the present disclosure, it should be noted that unless there are express rules and limitations, the terms such as "mount," "connect," and "bond" should be comprehended in broad sense. For example, it can mean a permanent connection, a detachable connection, or an integrate connection; it can mean a mechanical connection, an electrical connection, or can communicate with each other; it can mean a direct connection, an indirect connection by an intermediate, or an inner communication or an inter-reaction between two elements. A person skilled in the art should understand the specific meanings in the present disclosure according to specific situations.

At present, in large-sized display panels such as the large-sized display panels using oxide thin film transistors, impedance of data signal lines is usually reduced by increasing a thickness of the data signal lines. However, with increase of the thickness of the data signal lines, surface flatness of array substrates in the display panels is reduced. In particular, the array substrates are formed with higher protrusions at positions corresponding to the data signal lines, which results in that brushes cannot be pressed down in time when passing through the positions of the array substrates that correspond to the data signal lines during alignment processes such as rubbing alignment layers with the brushes, thereby causing a problem of insufficient rubbing alignment at nearby positions of the alignment layers corresponding to the data signal lines, thereby affecting normal display of the display panels.

In order to solve the above problems, the embodiments of the present disclosure provide a display panel and a display device. The following will describe them in detail, respectively. It should be noted that an order of description in the following embodiments is not meant to limit a preferred order of the embodiments.

Figure 2:
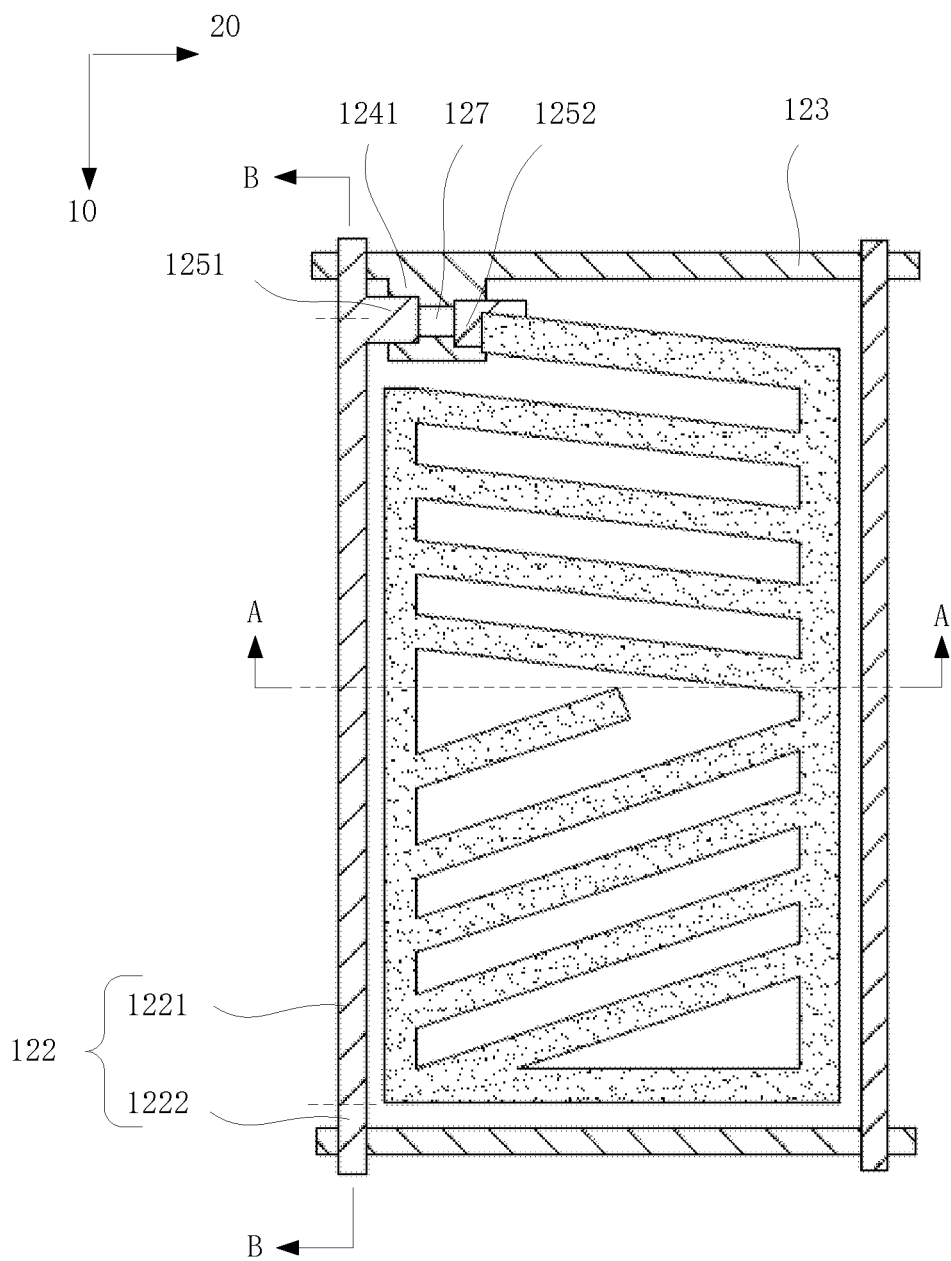
FIG. 2 is a schematic top view of the display panel at positions of pixel electrodes according to an embodiment of the present disclosure.
Figure 3:
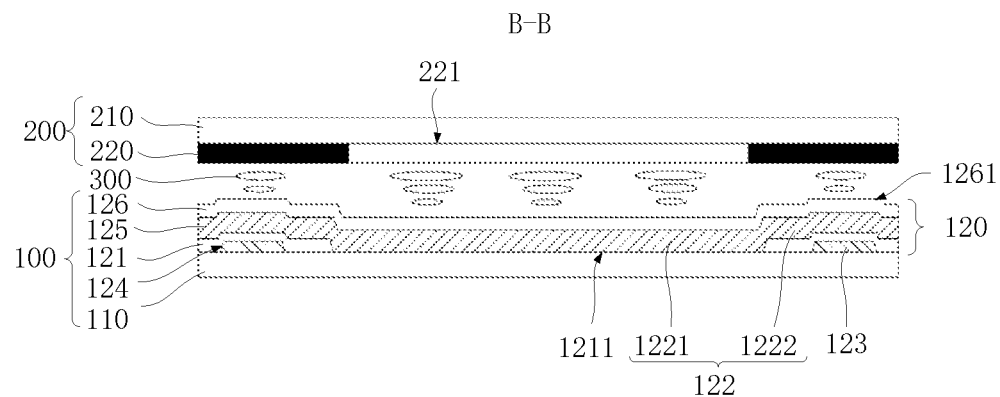
FIG. 3 is a schematic structural diagram of the display panel at a cross-section along line B-B in FIG. 2.

Referring to FIGS. 1 to 3, an embodiment of the present disclosure provides a display panel, which includes a first substrate 100, a second substrate 200 disposed opposite to the first substrate 100, and a liquid crystal layer 300 disposed between the first substrate 100 and the second substrate 200. The first substrate 100 includes a first base 110, a thin film transistor layer 120, and a plurality of pixel electrodes 130. The thin film transistor layer 120 is disposed on the first base 110 and includes an insulating layer 121 disposed on the first base 110, a plurality of data lines 122 disposed on the insulating layer 121 and extending along a first direction 10, and a plurality of scan lines 123 disposed on the insulating layer 121 and extending along a second direction 20. A default included angle is defined between the second direction 20 and the first direction 10. The plurality of pixel electrodes 130 are disposed on the thin film transistor layer 120 and located in areas divided by the data lines 122 and the scan lines 123. Wherein, the data lines 122 include a plurality of first subsections 1221 corresponding to the pixel electrodes 130 and a plurality of second subsections 1222 connected to the first subsections 1221, one first subsection 1221 is disposed between two adjacent pixel electrodes 130, and a sum of thicknesses of the insulating layer 121 and the first base 110 that at least correspond to positions of the first subsections 1221 is less than a sum of thicknesses of the insulating layer 121 and the first base 110 that correspond to positions of the pixel electrodes 130. In the embodiment, by dividing the data lines 122 into the plurality of first subsections 1221 corresponding to the pixel electrodes 130 and the plurality of second subsections 1222 connected to the first subsections 1221, and setting the sum of the thicknesses of the insulating layer 121 and the first base 110 that at least correspond to the positions of the first subsections 1221 to be less than the sum of the thicknesses of the insulating layer 121 and the first base 110 that correspond to the positions of the pixel electrodes 130, a height difference between positions of the first substrate 100 corresponding to the data lines 122 and corresponding to the pixel electrodes 130 can be reduced. Therefore, a problem of insufficient alignment due to low flatness of the first substrate 100 can be prevented, thereby ensuring normal display of the display panel.

It should be noted that the data lines 122 include the plurality of first subsections 1221 corresponding to the pixel electrodes 130 and the plurality of second subsections 1222 connected to the first subsections 1221. Wherein, each of the first subsections 1221 may be located between two adjacent pixel electrodes 130. In one data line 122, two adjacent first subsections 1221 are connected to each other by one second subsection 1222. In the first direction 10, a length of the first subsections 1221 may be greater than a length of the pixel electrodes 130, thereby reducing a probability of insufficient rubbing alignment of two adjacent pixel electrodes 130 in the second direction 20. In addition, in this embodiment, the display panel further includes an alignment layer (not shown in the figures), and the alignment layer is disposed on the thin film transistor layer 120 and the plurality of pixel electrodes 130. The pixel electrodes 130 may be four-domain or eight-domain structures, which are not limited herein. The data lines 122 extending along the first direction 10 and the scan lines 123 extending along the second direction 20 are both disposed on the insulating layer 121, that is, on one side of the insulating layer 121 away from the first base 110. Specifically, the first direction 10 is perpendicular to the second direction 20, and the default included angle defined between the second direction 20 and the first direction 10 is 90 degrees.

Figure 4:
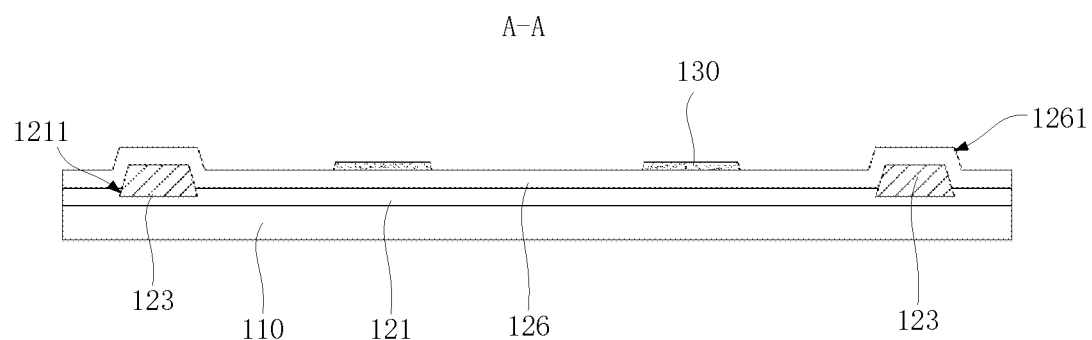
FIG. 4 is a first schematic structural diagram of the display panel at a cross-section along line A-A in FIG. 2.
Figure 5:
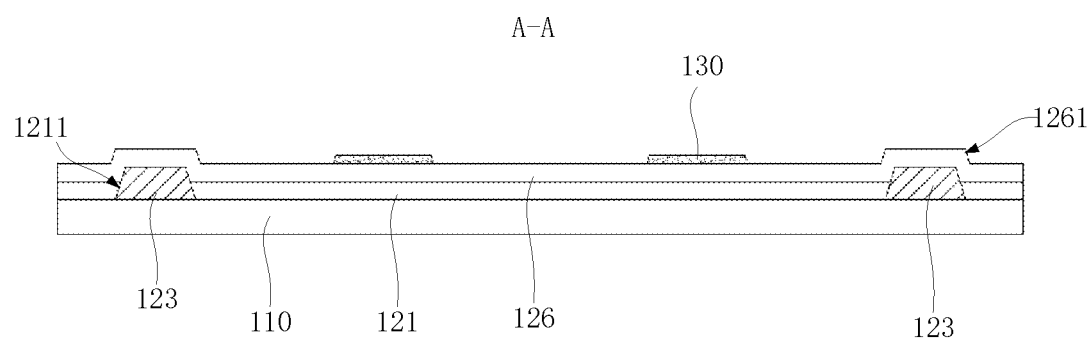
FIG. 5 is a second schematic structural diagram of the display panel at the cross-section along line A-A in FIG. 2.

In an embodiment, referring to FIGS. 2 to 4, the insulating layer 121 includes a plurality of first grooves 1211 corresponding to the first subsections 1221, and one first subsection 1221 is disposed in one first groove 1211; and in a direction perpendicular to the first substrate 100, a depth of the first grooves 1211 is less than or equal to a thickness of the insulating layer 121.

It can be understood that the insulating layer 121 includes the plurality of first grooves 1211 corresponding to the first subsections 1221, the plurality of first grooves 1211 correspond to the plurality of first subsections 1221 by one to one, and one of the first subsections 1221 is disposed in one of the first grooves 1211. Obviously, by defining the first grooves 1211 on positions of the insulating layer 121 corresponding to the first subsections 1221, overall thickness of the first substrate 100 at positions corresponding to the first subsections 1221 can be reduced, thereby improving overall flatness of the first substrate 100. In this embodiment, in the direction perpendicular to the first substrate 100, the depth of the first grooves 1211 is less than or equal to the thickness of the insulating layer 121. Specifically, the first grooves 1211 may be formed on the insulating layer 121 by a half-tone mask.

Figure 6:
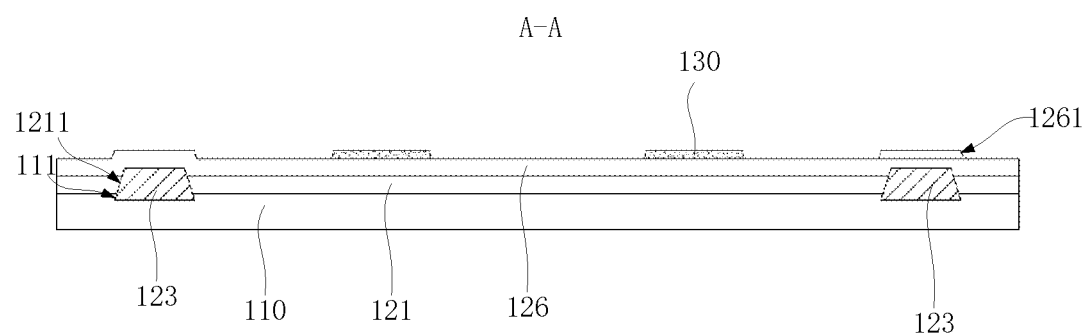
FIG. 6 is a third schematic structural diagram of the display panel at the cross-section along line A-A in FIG. 2.

In an embodiment, referring to FIG. 6, in the direction perpendicular to the first substrate 100, the depth of the first grooves 1211 is equal to the thickness of the insulating layer 121. The first base 110 includes a plurality of second grooves 111 corresponding to the first grooves 1211, in the direction perpendicular to the first substrate 100, the first grooves 1211 are communicated with corresponding second grooves 111, and the first subsections 1221 are at least partially located in the second grooves 111.

It can be understood that in the direction perpendicular to the first substrate 100, the depth of the first grooves 1211 is equal to the thickness of the insulating layer 121, that is, the first grooves 1211 penetrate through the insulating layer 121 in the direction perpendicular to the first substrate 100. Increasing the depth of the first grooves 1211 can further reduce the thickness of the first substrate 100 at the positions corresponding to the first subsections 1221 and improve overall flatness of the first substrate 100, thereby further preventing the problem of insufficient alignment. In this embodiment, the first base 110 includes the plurality of second grooves 111 corresponding to the first grooves 1211, and in the direction perpendicular to the first substrate 100, the first grooves 1211 are communicated with the corresponding second grooves 111. Obviously, when a thickness of the first subsections 1221 is greater than the thickness of the insulating layer 121, by defining the plurality of second grooves 111, making one second groove 111 correspond to one first groove 1211, and allowing the first grooves 1211 to be communicated with the corresponding second grooves 111, therefore, the first subsections 1221 are allowed to be at least partially located in the second grooves 111. Therefore, the thickness of the first substrate 100 at the positions corresponding to the first subsections 1221 can be better reduced, thereby ensuring the alignment effect of the first substrate 100 at the nearby positions corresponding to the first subsections 1221.

In addition, in this embodiment, referring to FIG. 6, in the direction perpendicular to the first substrate 100, a depth of the second grooves 111 is less than a thickness of the first base 110.

It can be understood that in the direction perpendicular to the first substrate 100, the depth of the second grooves 111 being less than the thickness of the first base 110 means that the second grooves 111 do not penetrate through the first base 110 in the direction perpendicular to the first substrate 100, thereby preventing the first subsections 1221 from being in contact with external environment and affecting device performances of the thin film transistor layer 120.

In an embodiment, referring to FIGS. 2 and 3, the thin film transistor layer 120 further includes a first metal layer 124 disposed between the insulating layer 121 and the first base 110, a second metal layer 125 disposed on one side of the insulating layer 121 away from the first metal layer 124, and a passivation protective layer 126 disposed on the second metal layer 125 and the insulating layer 121 and covering the second metal layer 125. The pixel electrodes 130 are disposed on the passivation protective layer 126, the first metal layer 124 includes the scan lines 123, and the second metal layer 125 includes the data lines 122. In the first direction 10, a spacing between the first grooves 1211 and the scan lines 123 is greater than or equal to 1.5 um.

It can be understood that the thin film transistor layer 120 may include thin film transistors, and a structure of the thin film transistors is not particularly limited. In this embodiment, the thin film transistors having a back channel structure are taken as an example for description. The first metal layer 124 includes the scan lines 123 and gate electrodes 1241, and the second metal layer 125 includes the data lines 122, source electrodes 1251, and drain electrodes 1252. The thin film transistor layer 120 further includes an active layer 127 disposed on the insulating layer 121, and the source electrodes 1251 and the drain electrodes 1252 are respectively connected to the active layer 127. In the first direction 10, the spacing between the first grooves 1211 and any one of the scan lines 123 is greater than or equal to 1.5 um. Obviously, the data lines 122 and the scan lines 123 are separated and insulated by the insulating layer 121. When a length of the first grooves 1211 in the first direction 10 is too long, a spacing between the data lines 122 and the scan lines 123 at an overlapping position will be too small, thereby causing a problem of electrical crosstalk at the overlapping position of the data lines 122 and the scan lines 123. Therefore, by making the spacing between the first grooves 1211 and any one of the scan lines 123 in the first direction 10 be greater than or equal to 1.5 um, the electrical crosstalk at the overlapping position of the data lines 122 and the scan lines 123 can be effectively prevented.

In an embodiment, referring to FIGS. 2-3, in the direction perpendicular to the first substrate 100, the depth of the first grooves 1211 is less than the thickness of the insulating layer 121. The insulating layer 121 includes a plurality of communicating grooves (not shown in the figures) corresponding to the second subsections 1222, in the first direction 10, two adjacent communicating grooves are communicated with each other by one first groove 1211, and one second subsection 1222 is disposed in one communicating groove.

It can be understood that when the depth of the first grooves 1211 is less than the thickness of the insulating layer 121 in the direction perpendicular to the first substrate 100, the plurality of communicating grooves corresponding to the second subsections 1222 may be defined on the insulating layer 121, the two adjacent communicating grooves can be communicated with each other by one first groove 1211, and one second subsection 1222 can be disposed in one communicating groove. Therefore, the thickness of the first substrate 100 corresponding to positions of each data line 122 can be reduced, thereby improving the overall flatness of the first substrate 100. In addition, the first grooves 1211 being communicated with the second grooves 111 also reduces the patterning complexity of the insulating layer 121. In this embodiment, in the direction perpendicular to the first substrate 100, the depth of the first grooves 1211 is equal to the depth of the second grooves 111.

In an embodiment, referring to FIGS. 3 to 7, the passivation protective layer 126 includes bosses 1261 corresponding to the second subsections 1222, and a thickness of the bosses 1261 is less than or equal to 300 nm.

It can be understood that by dividing the data lines 122 into the plurality of first subsections 1221 corresponding to the pixel electrodes 130 and the plurality of second subsections 1222 connected to the first subsections 1221, and setting the sum of the thicknesses of the insulating layer 121 and the first base 110 that at least correspond to the positions of the first subsections 1221 to be less than the sum of the thicknesses of the insulating layer 121 and the first base 110 that correspond to the positions of the pixel electrodes 130, the height difference between the positions of the first substrate 100 corresponding to the data lines 122 and corresponding to the pixel electrodes 130 can be reduced. Therefore, the problem of insufficient alignment due to low flatness of the first substrate 100 can be prevented. In this embodiment, by setting the thickness of the bosses 1261 of the passivation protective layer 126 that correspond to the second subsections 1222 to be less than or equal to 300 nm, a phenomenon that the brush cannot be pressed down in time at the position of the first substrate 100 corresponding to the first subsections 1221 can be prevented, thereby ensuring the alignment effect.

Figure 7:
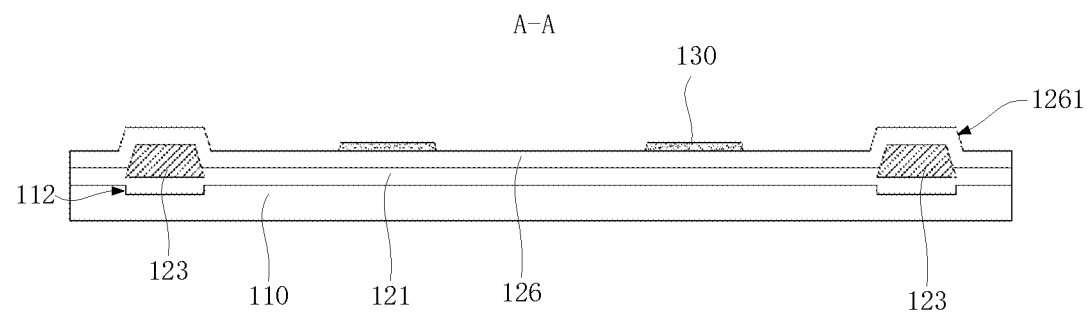
FIG. 7 is a fourth schematic structural diagram of the display panel at the cross-section along line A-A in FIG. 2.

In an embodiment, referring to FIG. 7, the first base 110 includes a plurality of third grooves 112 corresponding to the first subsections 1221, and the insulating layer 121 is disposed on the first base 110 and is at least partially filled in the third grooves 112. In the direction perpendicular to the first substrate 100, a depth of the third grooves 112 is less than the thickness of the first base 110.

It can be understood that the first base 110 includes the plurality of third grooves 112 corresponding to the first subsections 1221, and the insulating layer 121 is disposed on the first base 110 and is at least partially filled in the third grooves 112. By only defining the third grooves 112 on the first base 110, the sum of the thicknesses of the insulating layer 121 and the first base 110 at the positions corresponding to the first subsections 1221 can also be reduced. In addition, the insulating layer 121 being disposed on the first base 110 and at least partially filled in the third grooves 112 means that concave surfaces are formed on the insulating layer 121 at positions corresponding to the third grooves 112, and the first subsections 1221 are located on the concave surfaces, thereby improving the overall flatness of the first substrate 100. In this embodiment, in the direction perpendicular to the first substrate 100, the depth of the third grooves 112 is less than the thickness of the first base 110, thereby preventing the third grooves 112 from penetrating through the first base 110 in the direction perpendicular to the first substrate 100.

In an embodiment, referring to FIGS. 2-3, the second substrate 200 includes a second base 210 and a black matrix 220 disposed on one side of the second base 210 adjacent to the first base 110, and the black matrix 220 includes a plurality of light-transmitting openings 221 corresponding to the pixel electrodes 130 by one to one. In the first direction 10, a length of the first grooves 1211 is greater than a length of the light-transmitting openings 221.

It can be understood that the black matrix 220 includes the plurality of light-transmitting openings 221 corresponding to the pixel electrodes 130 by one to one, the light-transmitting openings 221 are light-emitting positions of the display panel, and color resists may be disposed in the light-transmitting openings 221. In the first direction 10, the length of the first grooves 1211 is set to be greater than the length of the light-transmitting openings 221 to allow a normal alignment part of the first substrate 100 corresponding to the pixel electrodes 130 on both sides of the first grooves 1211 can cover areas of the light-transmitting openings 221, thereby ensuring the normal display of the display panel.

Correspondingly, the present disclosure further provides a display device, which includes the display panel mentioned in any one of the above embodiments and a backlight module combined with the display panel.

In the embodiments of the present disclosure, by dividing the data lines 122 into the plurality of first subsections 1221 corresponding to the pixel electrodes 130 and the plurality of second subsections 1222 connected to the first subsections 1221, and setting the sum of the thicknesses of the insulating layer 121 and the first base 110 that at least correspond to the positions of the first subsections 1221 to be less than the sum of the thicknesses of the insulating layer 121 and the first base 110 that correspond to the positions of the pixel electrodes 130, the height difference between positions of the first substrate 100 corresponding to the data lines 122 and corresponding to the pixel electrodes 130 can be reduced. Therefore, the problem of insufficient alignment due to low flatness of the first substrate 100 can be prevented, thereby ensuring the normal display of the display panel.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A display panel, comprising a first substrate, a second substrate disposed opposite to the first substrate, and a liquid crystal layer disposed between the first substrate and the second substrate, wherein the first substrate comprises:
    a first base;
    a thin film transistor layer disposed on the first base and comprising an insulating layer disposed on the first base, a plurality of data lines disposed on the insulating layer and extending along a first direction, and a plurality of scan lines disposed on the insulating layer and extending along a second direction, wherein a default included angle is defined between the second direction and the first direction; and
    a plurality of pixel electrodes disposed on the thin film transistor layer and located in areas divided by the data lines and the scan lines;
    wherein the data lines comprise a plurality of first subsections corresponding to the pixel electrodes and a plurality of second subsections connected to the first subsections, one first subsection is disposed between two adjacent pixel electrodes, and a sum of thicknesses of the insulating layer and the first base at least corresponding to positions of the first subsections is less than a sum of thicknesses of the insulating layer and the first base corresponding to positions of the second subsections across the scan lines;
    wherein the insulating layer comprises a plurality of first grooves corresponding to the first subsections, and one first subsection is disposed in one first groove; in a direction perpendicular to the first substrate, a depth of the first grooves is less than or equal to a thickness of the insulating layer; and
    wherein in the direction perpendicular to the first substrate, the depth of the first grooves is equal to the thickness of the insulating layer; the first base comprises a plurality of second grooves corresponding to the first grooves, in the direction perpendicular to the first substrate, the first grooves are communicated with corresponding second grooves, and the first subsections are at least partially located in the second grooves.

2. The display panel according to claim 1, wherein in the direction perpendicular to the first substrate, a depth of the second grooves is less than a thickness of the first base.

3. The display panel according to claim 1, wherein the thin film transistor layer further comprises a first metal layer disposed between the insulating layer and the first base, a second metal layer disposed on one side of the insulating layer away from the first metal layer, and a passivation protective layer disposed on the second metal layer and the insulating layer and covering the second metal layer, the pixel electrodes are disposed on the passivation protective layer, the first metal layer comprises the scan lines, and the second metal layer comprises the data lines; and in the first direction, a spacing between the first grooves and the scan lines is greater than or equal to 1.5 um.

4. The display panel according to claim 3, wherein in the direction perpendicular to the first substrate, the depth of the first grooves is less than the thickness of the insulating layer; and the insulating layer comprises a plurality of communicating grooves corresponding to the second subsections, in the first direction, two adjacent communicating grooves are communicated with each other by one first groove, and one second subsection is disposed in one communicating groove.

5. The display panel according to claim 3, wherein the passivation protective layer comprises bosses corresponding to the second subsections, and a thickness of the bosses is less than or equal to 300 nm.

6. The display panel according to claim 1, wherein the first base comprises a plurality of third grooves corresponding to the first subsections, and the insulating layer is disposed on the first base and is at least partially filled in the third grooves; and in a direction perpendicular to the first substrate, a depth of the third grooves is less than a thickness of the first base.

7. The display panel according to claim 1, wherein the second substrate comprises a second base and a black matrix disposed on one side of the second base adjacent to the first base, and the black matrix comprises a plurality of light-transmitting openings corresponding to the pixel electrodes by one to one; and in the first direction, a length of the first grooves is greater than a length of the light-transmitting openings.

8. The display panel according to claim 1, wherein in the first direction, a length of one of the first subsections is greater than a length of a corresponding one of the pixel electrodes.

9. A display device, comprising a display panel and a backlight module combined with the display panel;

wherein the display panel comprises a first substrate, a second substrate disposed opposite to the first substrate, and a liquid crystal layer disposed between the first substrate and the second substrate, wherein the first substrate comprises:

a first base;

a thin film transistor layer disposed on the first base and comprising an insulating layer disposed on the first base, a plurality of data lines disposed on the insulating layer and extending along a first direction, and a plurality of scan lines disposed on the insulating layer and extending along a second direction, wherein a default included angle is defined between the second direction and the first direction; and a plurality of pixel electrodes disposed on the thin film transistor layer and located in areas divided by the data lines and the scan lines;

wherein the data lines comprise a plurality of first subsections corresponding to the pixel electrodes and a plurality of second subsections connected to the first subsections, one first subsection is disposed between two adjacent pixel electrodes, and a sum of thicknesses of the insulating layer and the first base at least corresponding to positions of the first subsections is less than a sum of thicknesses of the insulating layer and the first base corresponding to positions of the second subsections across the scan lines;

wherein the insulating layer comprises a plurality of first grooves corresponding to the first subsections, and one first subsection is disposed in one first groove; in a direction perpendicular to the first substrate, a depth of the first grooves is less than or equal to a thickness of the insulating layer; and wherein in the direction perpendicular to the first substrate, the depth of the first grooves is equal to the thickness of the insulating layer; the first base comprises a plurality of second grooves corresponding to the first grooves, in the direction perpendicular to the first substrate, the first grooves are communicated with corresponding second grooves, and the first subsections are at least partially located in the second grooves.

10. The display device according to claim 9, wherein in the direction perpendicular to the first substrate, a depth of the second grooves is less than a thickness of the first base.

11. The display device according to claim 9, wherein the thin film transistor layer further comprises a first metal layer disposed between the insulating layer and the first base, a second metal layer disposed on one side of the insulating layer away from the first metal layer, and a passivation protective layer disposed on the second metal layer and the insulating layer and covering the second metal layer, the pixel electrodes are disposed on the passivation protective layer, the first metal layer comprises the scan lines, and the second metal layer comprises the data lines; and in the first direction, a spacing between the first grooves and the scan lines is greater than or equal to 1.5 um.

12. The display device according to claim 11, wherein in the direction perpendicular to the first substrate, the depth of the first grooves is less than the thickness of the insulating layer; and the insulating layer comprises a plurality of communicating grooves corresponding to the second subsections, in the first direction, two adjacent communicating grooves are communicated with each other by one first groove, and one second subsection is disposed in one communicating groove.

13. The display device according to claim 11, wherein the passivation protective layer comprises bosses corresponding to the second subsections, and a thickness of the bosses is less than or equal to 300 nm.

14. The display device according to claim 9, wherein the first base comprises a plurality of third grooves corresponding to the first subsections, and the insulating layer is disposed on the first base and is at least partially filled in the third grooves; and in a direction perpendicular to the first substrate, a depth of the third grooves is less than a thickness of the first base.

15. The display device according to claim 9, wherein the second substrate comprises a second base and a black matrix disposed on one side of the second base adjacent to the first base, and the black matrix comprises a plurality of light-transmitting openings corresponding to the pixel electrodes by one to one; and in the first direction, a length of the first grooves is greater than a length of the light-transmitting openings.

16. The display device according to claim 9, wherein in the first direction, a length of one of the first subsections is greater than a length of a corresponding one of the pixel electrodes.

17. A display panel, comprising a first substrate, a second substrate disposed opposite to the first substrate, and a liquid crystal layer disposed between the first substrate and the second substrate, wherein the first substrate comprises:
- a first base;
- a thin film transistor layer disposed on the first base and comprising an insulating layer disposed on the first base, a plurality of data lines disposed on the insulating layer and extending along a first direction, and a plurality of scan lines disposed on the insulating layer and extending along a second direction, wherein a default included angle is defined between the second direction and the first direction; and
- a plurality of pixel electrodes disposed on the thin film transistor layer and located in areas divided by the data lines and the scan lines;
- wherein the data lines comprise a plurality of first subsections corresponding to the pixel electrodes and a plurality of second subsections connected to the first subsections, one first subsection is disposed between two adjacent pixel electrodes, and a sum of thicknesses of the insulating layer and the first base at least corresponding to positions of the first subsections is less than a sum of thicknesses of the insulating layer and the first base corresponding to positions of the second subsections across the scan lines;
- wherein the insulating layer comprises a plurality of first grooves corresponding to the first subsections, and one first subsection is disposed in one first groove; in a direction perpendicular to the first substrate, a depth of the first grooves is less than or equal to a thickness of the insulating layer; and
- wherein the thin film transistor layer further comprises a first metal layer disposed between the insulating layer and the first base, a second metal layer disposed on one side of the insulating layer away from the first metal layer, and a passivation protective layer disposed on the second metal layer and the insulating layer and covering the second metal layer, the pixel electrodes are disposed on the passivation protective layer, the first metal layer comprises the scan lines, and the second metal layer comprises the data lines; and
- in the first direction, a spacing between the first grooves and the scan lines is greater than or equal to 1.5 um.

18. The display panel according to claim 17, wherein in the direction perpendicular to the first substrate, the depth of the first grooves is less than the thickness of the insulating layer; and
- the insulating layer comprises a plurality of communicating grooves corresponding to the second subsections, in the first direction, two adjacent communicating grooves are communicated with each other by one first groove, and one second subsection is disposed in one communicating groove.

19. The display panel according to claim 17, wherein the passivation protective layer comprises bosses corresponding to the second subsections, and a thickness of the bosses is less than or equal to 300 nm.

20. The display panel according to claim 17, wherein the first base comprises a plurality of third grooves corresponding to the first subsections, and the insulating layer is disposed on the first base and is at least partially filled in the third grooves; and
- in a direction perpendicular to the first substrate, a depth of the third grooves is less than a thickness of the first base.

* * * * *